United States Patent [19]

Koai

[11] Patent Number: 5,615,035
[45] Date of Patent: *Mar. 25, 1997

[54] PHOTONIC DUAL BUS FOR WIDE-AREA CATV BROADCAST AND DATA TRANSPORT

[75] Inventor: Kwang-Tsai Koai, Concord, Mass.

[73] Assignee: GTE Laboratories Incorporated, Waltham, Mass.

[*] Notice: The term of this patent shall not extend beyond the expiration date of Pat. No. 5,526,152.

[21] Appl. No.: 530,796

[22] Filed: Sep. 20, 1995

Related U.S. Application Data

[63] Continuation of Ser. No. 200,115, Feb. 22, 1994, abandoned, which is a continuation-in-part of Ser. No. 127,189, Sep. 24, 1993, Pat. No. 5,526,152.

[51] Int. Cl.⁶ .............................. H04B 10/20; H04J 14/00
[52] U.S. Cl. ..................... 359/119; 359/158; 370/491
[58] Field of Search ................... 359/118–119, 125–126, 359/137, 152, 158, 164, 166–167, 173, 179, 188, 195, 176; 370/74, 98, 105.3, 110.3, 124; 455/6.1

[56] References Cited

U.S. PATENT DOCUMENTS 4,730,301  3/1988  McMahon ............................... 359/119
5,185,814  2/1993  Healey ................................... 359/160

FOREIGN PATENT DOCUMENTS 0222533  9/1989  Japan .................................... 359/118

OTHER PUBLICATIONS

Cheung et al., "Estimated–Queue Expanded Bus (EQEB) Protocol for Single–Hop Multichannel Lightwave Networks", Electronics Letters, 23rd Apr. 1992 vol. 28 No. 9, pp. 855–857.

Abeysundara et al., "Z–Net: A Dual Bus Fiber–Optic LAN Using Active and Passive Switches" IEEE, 1989, pp. 19–27.

Primary Examiner—Wellington Chin
Assistant Examiner—Kinfe-Michael Negash
Attorney, Agent, or Firm—Leonard C. Suchyta

[57] ABSTRACT

Apparatus is disclosed which is advantageously used in local area, metropolitan-area, and wide-area networks using a dual bus architecture, and more particularly to a dual bus network design having significantly increased distance before termination or regeneration of the optical signal, and using wavelength division multiplexing (WDM) at one optical wavelength to transmit data over the bus and a second optical wavelength to transmit a clock signal and a CATV video signal.

5 Claims, 4 Drawing Sheets

PHOTONIC DUAL BUS FOR WIDE-AREA CATV BROADCAST AND DATA TRANSPORT

RELATED APPLICATIONS

This application is a continuation of application Ser. No. 08/200,115, filed on Feb. 22, 1994, now abandoned which is a continuation in part of Ser. No. 08/127,189 filed Sep. 24, 1993, now U.S. Pat. No. 5,526,152.

FIELD OF THE INVENTION

This invention relates generally to local area, metropolitan-area, and wide-area networks using a dual bus architecture, and more particularly to a dual bus network design having significantly increased distance before termination or regeneration of the optical signal, and using wavelength division multiplexing (WDM) at one optical wavelength to transmit data over the bus and a second optical wavelength to transmit a clock signal and a CATV video signal.

BACKGROUND OF THE INVENTION

Significant demand for gigabit metropolitan-area networks (MAN) and wide-area networks (WAN) is surfacing and several experimental networks are in the process of being implemented. These networks use electronic repeaters to regenerate the signal at each node before further retransmission. Regenerative repeaters, however, impose performance and reliability constraints due to the electronic processing at each node, which thus limits the operating data rates of the network. Further, a single component failure may compromise the integrity of the entire network. Moreover, these topologies rely on technology that still needs significant improvement.

For gigabit networks without repeaters, considerable interest has been focused on wavelength division multiplexed (WDM) star networks as described in "Dense Wavelength Division Multiplexing Networks: Principles and Applications", by Charles A. Brackett, in the *IEEE Journal on Selected Areas in Communications*, Vol. 8, No. 6. August 1990, and most recently ring networks using distributed optical amplification as described in "Optical Ring Networks with Distributed Amplification", by Evan Goldstein, in *IEEE Photonics Technology Letters*, Vol. 3, No. 4, April 1991.

Dual bus networks, using a Distributed Queue Dual Bus (DQDB) protocol as described in Distributed Queue Dual Bus Subset of a Metropolitan Area Network, IEEE, New York, July 1990 are an attractive choice for MAN and WAN environments because of excellent network survivability and flexibility, DQDB networks have shown quite efficient operations even when the data rate is high or the propagation delay over the network is large.

The IEEE 802.6 standard using the DQDB architecture is emerging as an international standard for Metropolitan Area Networks (MAN). With the widespread demand for multimedia applications, it is desirable to provide for transmission and reception of both video and data over a network employing the DQDB architecture. High capacity CATV broadcast, multimedia, and data communication services are but some of the services that may be offered over a wide geographical area.

OBJECTS OF THE INVENTION

It is a primary object of the invention to obviate the above noted disadvantages of the prior art.

It is a further object of the invention to provide for a dual bus communications network using optical fiber to implement each bus, and providing for simultaneous transport of both CATV broadcast and data communication services.

It is a yet further object of the invention to provide for simultaneous transport of both CATV broadcast and data communication services on a dual bus communications network with increased distance before regeneration of the signals is required.

It is a still further object of the invention to provide for simultaneous transport of both CATV broadcast and data communication services on a dual bus communications network wherein the video and data communication signals are not regenerated at each node.

SUMMARY OF THE INVENTION

These and other advantages and objects of the invention are provided for herein.

In one aspect of the invention, an N-node looped bus network, having a head node and N-1 intermediate nodes, operates according to the DQDB architecture with dual optical fibers, acting as Bus A and Bus B respectively. Each Bus employs two optical carriers, at separate wavelengths within a narrow optical band. Data superimposed on the second optical carrier of the network is bit synchronized by a continuous clock provided by the head node on the first optical carrier, using a pilot tone at the high end of the signaling band. A CATV broadcast signal is further imposed on the first wavelength for distribution of that signal from the head node of the bus to the intermediate nodes. Each intermediate node may provide for further broadcast of the CATV signal. Data cell or packet framing is accomplished by periodically inserting a code word onto each bus from the head node. At the end of the bus, both lightwaves are terminated.

In a further aspect of the invention, an intermediate node connects to each bus via two directional coupler taps to transmit and receive signals to and from both Bus A and Bus B. The receiver and transmitter directional coupler taps are coupled to a receiver and transmitter respectively. A fiber delay line may be inserted between the directional taps, and an optical amplifier is configured inline after the transmit directional coupler. This configuration advantageously provides for an optical network allowing for increased distance over conventional DQDB networks between intermediate nodes, and increased network integrity in the event of a receiver or transmitter failure at a node due to the decreased need to regenerate the signal at each intermediate node.

DETAILED DESCRIPTION OF THE INVENTION

Figure 1:
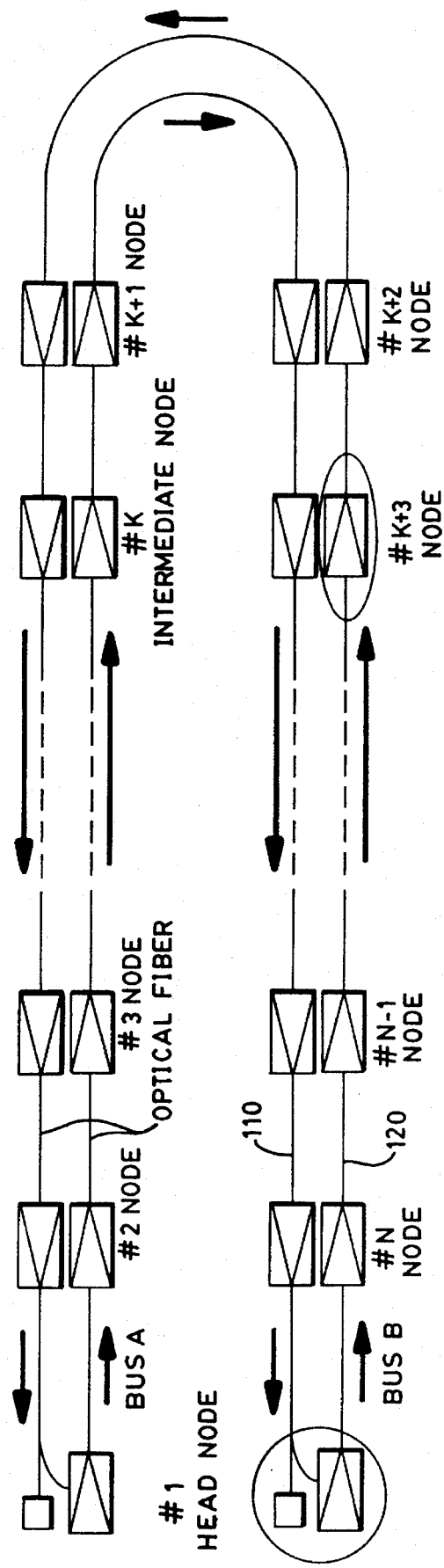
FIG. 1 is an illustration of a dual bus communication network in which the current invention may be utilized.

A network of N nodes, configured in a dual bus architecture, is shown in FIG. 1. The nodes on the network may be general purpose computers, personal computers, or electronic devices performing specialized applications. In one embodiment of the invention, the dual bus architecture operates according to the IEEE 802.6 standard for metropolitan-area networks (MAN), IEEE 802.6 Distributed Queue Dual Bus Subnet of a Metropolitan Area Network, IEEE, New York, July 1990, which is incorporated by reference herein. However, one of ordinary skill in the art will recognize that the inventions disclosed herein are not limited to the IEEE 802.6 standard but may be applicable to other dual bus configurations. Each node on the network connects to Bus A 110 and to Bus B 120. Bus A 110 and Bus B 120 are implemented as optical fibers. Each node in the network may transmit and receive on both Bus A 110 and Bus B 120. Node 1 is designated the head of the bus, while the other nodes are designated as intermediate nodes. As shown in FIG. 1, in one embodiment of the invention both Bus A 110 and Bus B 120 loop from the head of bus, node 1, through the intermediate nodes and return back to the head of the bus, node 1. In another embodiment of the invention, the head nodes of Bus A 110 and Bus B 120 are not located at the same geographical location, thus forming an open dual bus configuration.

Figure 2:
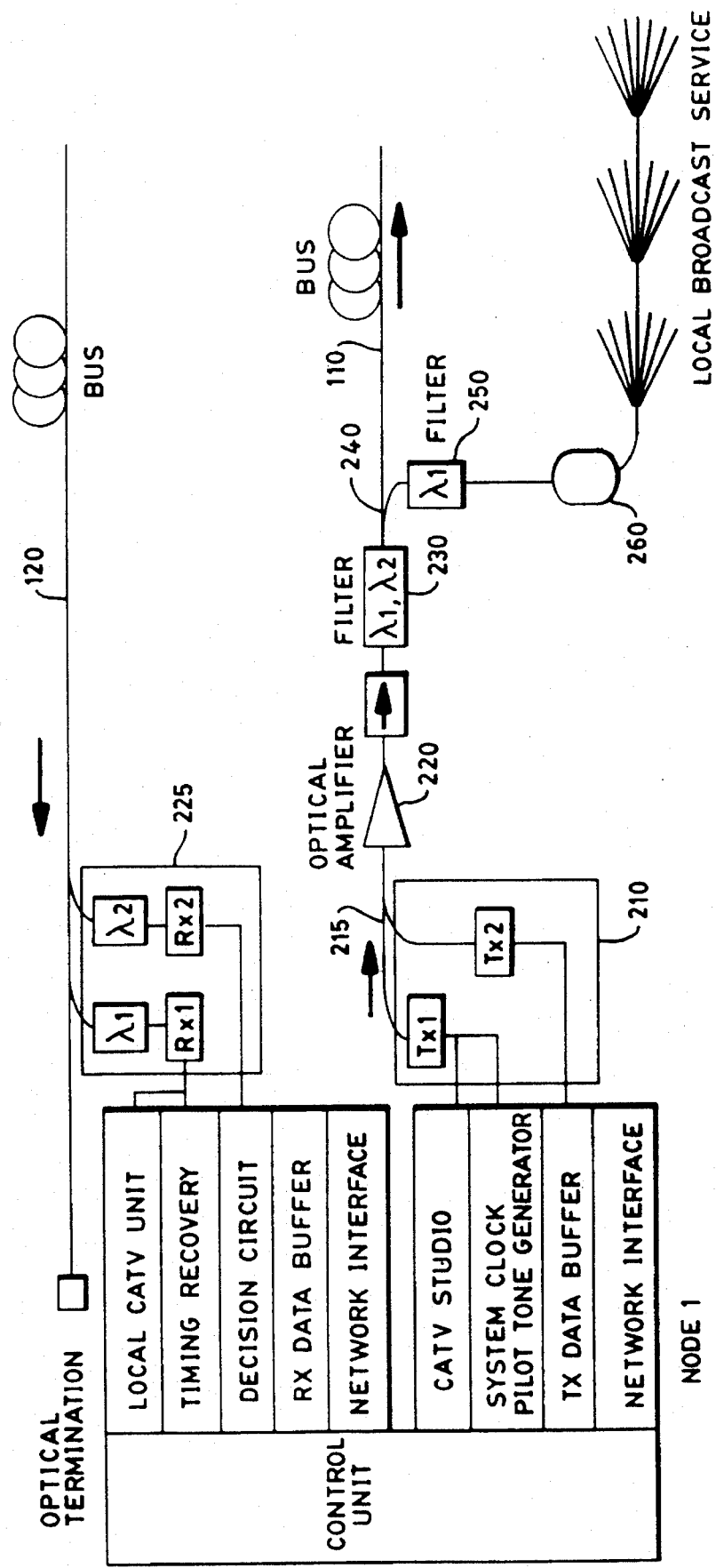
FIG. 2 depicts the connections for the head node to a bus in accordance with the current invention.

Referring now to FIG. 2, the connection of the head of the bus node, node 1, to the optical bus will now be described. Node 1 interconnects to both Bus A 110 and Bus B 120. With the understanding that the connections to both Bus A 110 and Bus B 120 are the same for the head of each respective bus, the connection for Bus A 110 will be described for exemplary purposes. Node 1 is coupled to Bus A 110 through an opto-electronic transmitter 210 for converting the electrical signals of node 1 to the optical domain for transmission on Bus A 110. Node 1 transmits two signals, one at wavelength $\lambda_1$ and the other at wavelength $\lambda_2$, which are coupled to Bus A 110 via a passive fiber coupler 215, and the combined signal is amplified by optical amplifier 220. A bandpass filter 230 is utilized to reduce noise from the optical amplifier 220. An optical carrier at wavelength $\lambda_1$ is continuously transmitted on each bus from the head of bus. This carrier carries the system clock on a pilot tone to be used for network synchronization, and further stabilizes the gain for optical amplifier 220 and other down stream optical amplifiers associated with the intermediate nodes, which are described later. The signal imposed on wavelength $\lambda_1$ may also carry a signal for CATV broadcast of video information. The optical signal composed of wavelengths $\lambda_1$ and $\lambda_2$ is tapped at tap 240, and the tapped signal is input to a bandpass filter 250 producing only the CATV signal on wavelength $\lambda_1$. This resultant CATV signal is input to a Local CATV Unit 260 for transmission of the CATV signal through the local broadcasting services. Node 1 transmits at wavelength $\lambda_2$ empty data slots which are delineated by code words for use of the intermediate nodes in transferring data.

Bus B 120 is terminated at node 1. Optical taps are used to tap the optical radiation from the bus, and convert the received signal from the optical domain to the electrical domain at opto-electronic receiver 225 for processing at node 1. For the head node, the use of such a tap is optional depending on the signal power of the network.

Figure 3:
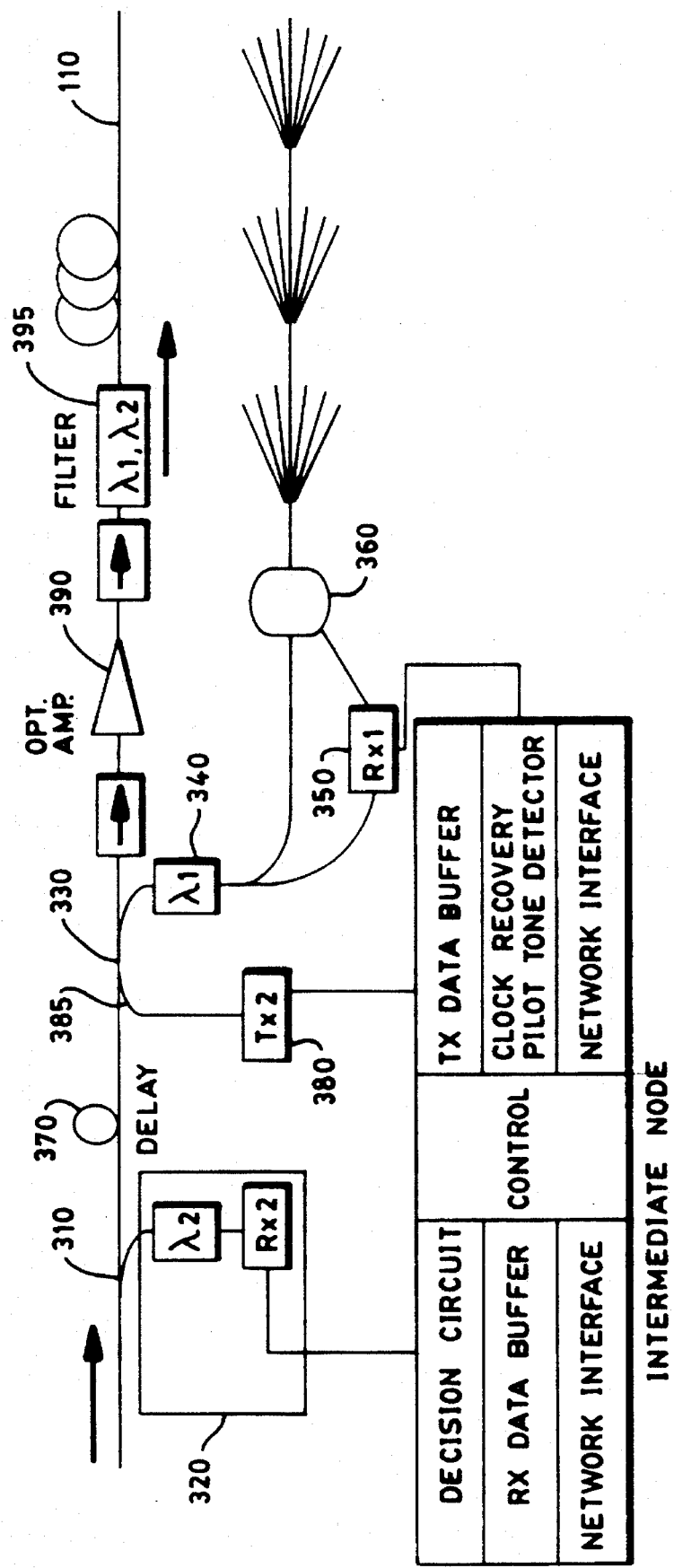
FIG. 3 depicts the connections for an intermediate node to a bus in accordance with the current invention.

Referring now to FIG. 3, the connection of an intermediate node to the optical bus will now be described. While all intermediate nodes connect to either Bus A 110 or Bus B 120 in the same manner, Bus A 110 will be used for exemplary purposes. A directional coupler 310 taps off the signal imposed on wavelength $\lambda_2$, which is presented to an opto-electronic receiver 320 for conversion to the electrical domain. The optical radiation received consists of the network data to be processed by the node. The combined optical signal on Bus A 110 is again tapped at tap 330 and presented to bandpass filter 340 to select only the signal at wavelength $\lambda_1$, which consists of only the clock signal and the CATV broadcast signal. The signal on $\lambda_1$ is then split, passed through opto-electronic receiver 350 and presented to the intermediate node for clock recovery processing, and is also presented to the Local CATV Unit 360 for local broadcast of the CATV signal. That portion of the optical radiation not tapped off at tap 310 continues on Bus A 110 through fiber delay 370 in order to delay the signal to allow the node to process the received data, and recognize empty bus slots for transmission by the node. One of ordinary skill in the art will recognize that in the event of a node failure, further transmission of the clock signal or data along the bus is not impeded since neither is regenerated at the node.

If a node desires to transmit data on Bus A 110, after the receiver identifies an empty data slot, the node sends the data to be transmitted to opto-electronic transmitter 380 for conversion from the electrical to the optical domain. Opto-electronic transmitter 380 is coupled to Bus A 110 by a passive directional coupler 385. Data is transmitted into an empty bus slot using wavelength $\lambda_2$ and then amplified at optical amplifier 390. The output of the optical amplifier 390 is put through a bandpass filter 395 to reduce noise.

Figure 4:
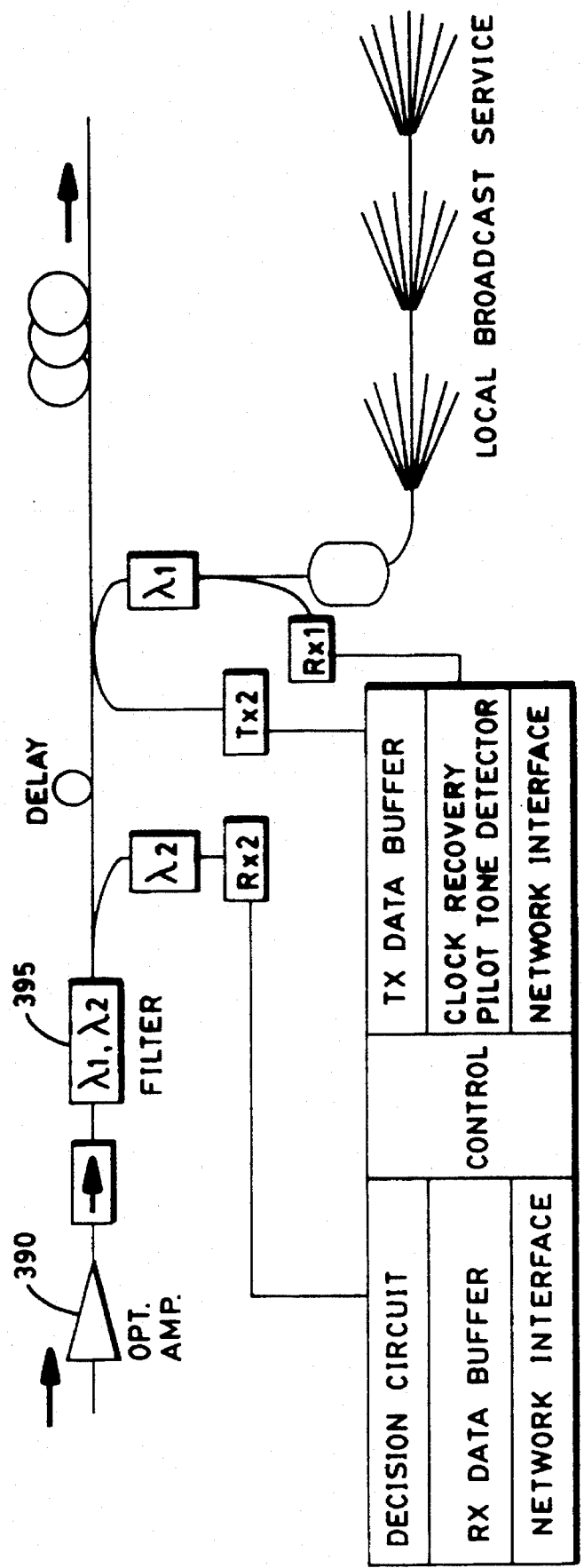
FIG. 4 depicts the connections for an alternate embodiment of an intermediate node to a bus in accordance with the current invention.

One of ordinary skill in the art will recognize that optical amplifier 390 and bandpass filter 395 can be placed before the optical receiver as shown in FIG 4.

The applications of the described lightwave buses can be implemented as a LAN, MAN, or WAN. Within the fiber nonlinearity constraints, the geographical span of such networks is limited by fiber dispersion but can exceed 5,000 km if chirp-free transmitters and low-dispersion fiber are used. It is also possible to use soliton techniques to overcome the dispersion limit. A network protocol such as DQDB can be adopted for the proposed network. For high-capacity networks with large line lengths, the efficiency can be kept high by increasing the number of packets each node can send in a cycle, or by using a bandwidth balancing scheme as described in the DQDB architecture.

Multigigabit networks with reasonable efficiency supporting many nodes covering a large geographical area can be built with currently available technology. Since the most popular and flexible mesh networks can be built by the overlay of many bus networks, the described lightwave buses are potentially very useful for many applications in both public and private networks.

While there has been shown and described what is at present considered the preferred embodiment of the invention, it will be obvious to those skilled in the art that various changes and modifications may be made therein without departing from the invention as defined by the appended claims.

What is claimed is:

1. A communications network having a head node and a plurality of intermediate nodes comprising: a dual bus means for transferring an optical signal comprised of a CATV broadcast signal and a pilot tone imposed on a first wavelength and a data signal imposed on a second wavelength from said head node to said plurality of intermediate nodes;

a tap means for tapping said optical signal producing a tapped optical signal;

receiver means for receiving said tapped optical signal from the tap means including a pilot tone detector for detecting said pilot tone;

wherein said receiver means clocks said data of the optical signal and said received optical signal is not regenerated by an intermediate node.

2. The communications network of claim 1 wherein the dual bus means is a looped bus.

3. The communications network of claim 1 wherein the dual bus means is an open bus.

4. The communications network of claim 1 wherein the dual bus means is a fiber optic cable.

5. The communications network of claim 1 wherein the dual bus means operates in accordance with the DQDB architecture.

* * * * *